US005845996A

United States Patent [19]
Greubel et al.

[11] Patent Number: 5,845,996
[45] Date of Patent: *Dec. 8, 1998

[54] LINEAR GUIDE UNIT

[75] Inventors: Roland Greubel, Ramsthal; Bernhard Keller, Kaisten, both of Germany

[73] Assignee: Deutsche Star GmbH, Schweinfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 619,295

[22] Filed: Mar. 21, 1996

[30] Foreign Application Priority Data

Sep. 5, 1995 [DE] Germany ................. 195 32 759.4

[51] Int. Cl.⁶ ........................... F16C 29/06; F16C 35/00
[52] U.S. Cl. ............................................. 384/45; 384/441
[58] Field of Search ..................... 384/45, 441, 43

[56] References Cited

U.S. PATENT DOCUMENTS

| | | | |
|---|---|---|---|
| 1,652,368 | 12/1927 | Layne | 384/441 |
| 4,025,995 | 5/1977 | Thomson | 384/45 |
| 4,149,759 | 4/1979 | Miller | 384/441 |
| 4,614,382 | 9/1986 | Teramachi | 384/45 |
| 4,704,913 | 11/1987 | Zimmer . | |
| 4,887,477 | 12/1989 | Hauser et al. . | |
| 5,097,716 | 3/1992 | Barbat et al. . | |
| 5,195,391 | 3/1993 | Barbat et al. . | |
| 5,390,552 | 2/1995 | Tsukada | 384/45 |
| 5,475,275 | 12/1995 | Dohogne et al. | 384/441 |

FOREIGN PATENT DOCUMENTS

| | | |
|---|---|---|
| 0340751 | 11/1989 | European Pat. Off. . |
| 0708273A2 | 4/1996 | European Pat. Off. . |
| 2910373 | 9/1980 | Germany . |
| 8802615 | 5/1988 | Germany . |
| 8806099 | 9/1988 | Germany . |
| 3806613 | 9/1989 | Germany . |
| 8910548 | 12/1989 | Germany . |
| 4226292 | 2/1993 | Germany . |
| 9313148 | 12/1993 | Germany . |
| 9218627 | 1/1995 | Germany . |
| 0222619 | 12/1984 | Japan ........................... 384/45 |
| 0618246 | 1/1986 | Japan . |
| 0012122 | 1/1989 | Japan ........................ 384/441 |
| 2150134 | of 1990 | Japan . |
| 1248578 | 10/1971 | United Kingdom ............ 384/45 |
| 2250788 | 6/1992 | United Kingdom ........... 384/441 |
| WO8605734 | 10/1986 | WIPO . |

OTHER PUBLICATIONS

English language abstract of Japanese reference No. JP-A-61-8246, published Jan. 14, 1986.

Leaflet "Linearmodule, Verbindungssystem für Linearmodule" (Deutshe Starr) No. RD 82400/02.95.

German brochure, Europa–Lehrmittel, Fachkunde für metallverabeitende Berufe, Verlag Willing & Co., 13 Edition, 1955, pp. 228–229.

Deutsche Star Leaflet "Modul MKR 25–145", Apr. 1995.

Leaflet MKZ 25–145 (Deutsche Star) published in Apr., 1995 at the Hanover Fair.

Leaflet "Spielarme Schneckengetriebe für Servo–Systeme, Elemente–Module–Systeme" (Güdel Lineartec).

*Primary Examiner*—Charles A. Marmor
*Assistant Examiner*—Matthew A. Kaness
*Attorney, Agent, or Firm*—Baker & Botts, L.L.P.

[57] ABSTRACT

A linear guide unit comprises a hollow elongated member of rectangular cross section, two parallel guide rails mounted on one wall of the elongated member, and at least one runner supported for movement on each of the guide rails. At least one wall of the elongated member other than the one on which the guide rails are mounted has a plurality of T-section grooves, which serve for the fastening of attachments. The runners are U-shaped, straddle the respective guide rails, and are carried on the said guide rails by closed rolling-member circuits. The elongated member may be combined with a variety of linear drive units of different types.

39 Claims, 9 Drawing Sheets

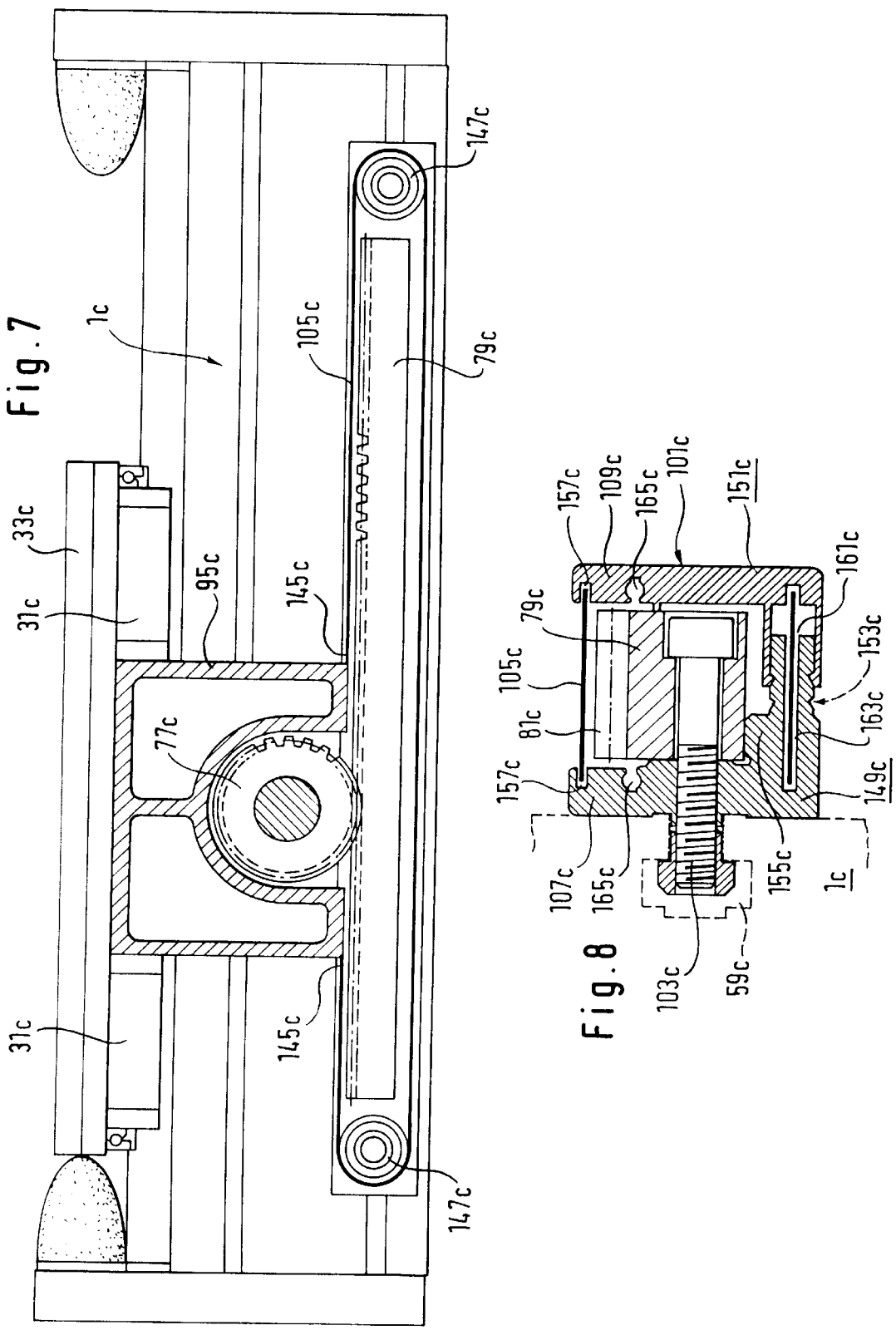

LINEAR GUIDE UNIT

BACKGROUND OF THE INVENTION

The present invention concerns a linear guide unit comprising an elongated member having a longitudinal axis and a rail system with at least two guide rails arranged outside on the longitudinal member with rail axes parallel to one another and to the longitudinal axis and at least one runner assembly that is carried for displacement on the rail system. The elongated member is an extruded hollow section which has on its surface accessible from outside at least one fastening groove, preferably under-cut, extending in the direction of the longitudinal axis.

Such a linear guide unit is disclosed in a prospectus, "Spielarme Schneckengetriebe für Servo-Systeme, Elemente-Module-Systeme"[Low-play screw drive for servo-systems, element-module systems], of the Güdel Lineartec firm under the title "Linearführung mit Prismenprofil" [Linear guide with prism section].

In the aforementioned known guide unit, a one-piece continuous table is carried on two guide rails by individual rollers which are supported for rotation on the table with roller axes arranged perpendicular to the plane of the table and fixed on the underside of the table. The rollers are arranged on the sides of the guide rails that face outwardly away from one another, so that a linear guide unit having a relatively wide design results, in that the table is considerably wider than the hollow section by which it is supported.

SUMMARY OF THE INVENTION

The present invention provides an arrangement in which the runner assembly associated with at least one of the guide rails comprises at least one U-shaped runner that is guided by the respective guide rail and has at least two rolling-member circuits integrated into the respective runner.

The U-shaped, enveloping form of the runner about the guide rail makes it possible to produce a narrower linear guide unit whose runners do not project, or project only insignificantly, laterally beyond the hollow section. In addition, as compared with the above-mentioned known guide unit, far higher stability about the longitudinal axis is obtained, to which the multiplicity of points of contact between runners and guide rails contributes. This increases the load-carrying capacity and the torque capacity of the guide unit.

The linear guide unit according to the invention is especially suitable for use in applications in which great operating speeds and high guiding accuracy are demanded, such as machine tools and automatic handling equipment. In principle, however, other applications are possible, for example, in windshield wiper or garage-door drives or in measuring arrangements for guiding a measuring member or a measuring instrument.

It is structurally advantageous when the guide rails in each instance have a fastening surface, a head face distant from the fastening surface, and two side faces adjoining the head face, that a rib region of the at least one runner lies adjacent to the head face of its associated guide rail and two arm parts connected by the rib region lie adjacent to the side faces of the said guide rail. For reasons of symmetry, each of the side faces will have at least one load-carrying raceway for the load-transmitting parts of each rolling-member loop, resulting in especially high stability when at least two such load-carrying raceways are provided for each side face. Thus, the runners are carried in a manner that is resistant to tipping on their respective guide rails.

As is known per se from the aforementioned guide unit, the hollow section—viewed in a cross section orthogonal to the longitudinal axis—may have a substantially rectangular out-line. Then the guide rails advantageously are arranged in the corner regions of a rectangular side, in order to obtain as great as possible a distance between the guide rails.

A highly desirable aspect of the invention is to be found in that a user is able to assemble, in modular fashion, a solution suitable for his particular application from the individual components supplied by the manufacturer. Here, the properties of the linear guide unit according to the invention as a versatile, mechanically (and alternatively, if desired, electrically) functional module per se advantageously become effective. The user obtains considerable cost savings when he assembles his solution modularly, rather than having it custom-made by the manufacturer. This advantage becomes especially clear when relatively costly and complex solutions are involved, for example, a multiple-coordinate guide for a tool grip of an automatic handling machine operable in multiple directions. Then, the user can even carry out conversion measures with his own hands, or make repairs himself by replacement of individual components, which further reduces costs. The components to be supplied by the manufacturer may be designed with mechanical and, if desired, electrical connecting means as well, so that they are substantially universally capable of combination with one another.

The preceding aspect of the invention is facilitated by the use of an extruded section with outer fastening grooves and U-shaped runners. Extruded sections, particularly of light metal, are very simple and economical to produce. The fastening grooves allow virtually any desired application of the hollow section, wherein connecting parts may be mounted on the hollow section without additional adjustments or the hollow section may be fixed in a built-in environment. Commercially available, mass-produced elements are available for the runners, where, depending upon the application, runners with different load capacities may be used.

The preferred refinements of the invention described below are likewise to be viewed from the standpoint of making available a linear guide unit, suitable for use within the context of a modular system, by simple means and using commercial or easily fabricated components as much as possible.

In order to make universal fastening for the guide rails a possibility, it is proposed that a fastening groove for the fastening of fastening surfaces of each of the two guide rails be provided in the corner regions of a rectangular side jointly associated with the two guide rails. In this way, an exactly rectilinear course of the guide rails can be ensured by at least one contact edge at the hollow section in each instance, on which a side face of the respective guide rail rests. Then, at least one additional fastening groove is advantageously provided on at least one additional rectangular side, preferably in such a way that, on at least one of the rectangular sides which run from the rectangular side jointly associated with the guide rails to the opposite rectangular side distant from the rails, at least two fastening grooves are provided, preferably one near each of their respective corner regions.

For other than fastening purposes, at least one secondary groove extending in the direction of the longitudinal axis, and preferably a plurality of secondary grooves, may be provided on at least one of the other three rectangular sides which are not associated with the guide rails, between their respective corner regions. Such secondary grooves may be used, for example, in conjunction with an arrangement of proximity or limit switches for positioning or determining the position of the runners relative to the hollow section. An especially light yet distortion and bending-proof embodiment of the hollow section is obtained when the hollow section is a multiple-chamber hollow section with an outer wall, a primary inner chamber closed all around by an inner chamber wall, and bracing ribs connecting the inner chamber wall with the outer wall. Resistance to bending and distortion loads can be further increased in that a corner rib runs from the inner chamber wall to each of the four corner regions of the outer wall and in that, in addition, a center rib runs from the inner chamber wall to a wall jointly associated with the two guide rails as well as to the opposite wall of the outer wall distant from the rails. If desired, there the latter center rib may form a juncture between the inner chamber wall and the outer wall. This may be the case especially when the primary inner chamber is at a greater distance from the rectangular side of the rectangular envelope of the hollow section associated with the two guide rails than from the opposite rectangular side of the said envelope distant from the rails. The importance of this measure, as well as of the measure that the wall of the outer wall jointly associated with the two guide rails is set back in a region lying between the two guide rails with respect to the associated corner regions in the direction of the inner chamber wall, is described in greater detail below.

Advantageously, a bridge unit is connected with at least one runner on each of the two guide rails for common movement along the longitudinal axis. Then, an object to be transported may be mounted on the said bridge unit. Similarly, connection to a stationary base structure may be produced through the bridge unit when the hollow section is to be movable. Versatility of the bridge unit is obtained when it in turn has at least one fastening groove, parallel to the longitudinal axis and accessible from outside. The hollow section and the bridge unit advantageously have like fastening grooves.

A bridge unit connected in one piece with the runners is possible. However, from the point of view of use of commercially mass-produced parts as much as possible, it is proposed that the bridge unit rest on connecting faces of the runner parallel to one another and be connected in the region of the said surfaces with the runners.

In addition, the linear guide unit according to the invention may be equipped with at least one linear drive unit, in order to move the runner assembly or a bridge unit connected with the runner assembly parallel to the longitudinal axis, relative to the hollow section.

A wide variety of designs are possible for the linear drive unit. The drive unit may comprise at least one flexible traction means, closed into a loop, which is reversed by reversing means at the ends of the hollow section, has parts driving the runner assembly at the outer wall and has returning parts which travel within the primary inner chamber or an additional secondary inner chamber delimited by bracing ribs adjacent to one another. In conjunction with such a flexible traction means, the advantage of an eccentrically arranged primary inner chamber becomes clear. Namely, a fairly large space is then available for the reversing means, so that a greater reversing radius may be selected, which facilitates reversal and in some cases permits greater drive forces. Conveyance of the returning parts of the flexible drive means within the hollow section protects them from damage and fouling.

In another embodiment, the linear drive unit comprises a drive spindle, running parallel to the longitudinal axis and connected with a rotary drive, which is arranged axially fixed outside the outer wall on the hollow section and is in threaded engagement with a nut that is supported on the runner assembly or on the bridge unit. In this case, the setback arrangement of the outer wall regions lying between the two guide rails, previously mentioned, permits compact and space-saving accommodation of the drive spindle and the nut in the space lying between the two guide rails, making for great freedom of design of the bridge unit.

The linear drive unit may in addition be designed as a toothed drive unit with a longitudinal toothed rack arranged at the outer side of the hollow section parallel to the longitudinal axis and with a drive motor which is connected to the runner assembly or the bridge unit for common movement and drives—through a gear unit, if desired—a toothed wheel meshing with the longitudinal toothed rack.

In this connection, it is preferably provided that, in design of the hollow section with a substantially rectangular cross section, the longitudinal toothed rack is mounted on a side that adjoins the side on which the guide rails are mounted and that the drive motor with the toothed wheel—and optionally with the gear unit—is arranged laterally adjacent to the side on which the toothed rack is mounted. In addition to an extremely compact structure, this results in sufficient room for an object to be clamped on the runners and moved relative to the hollow section. The said object may be brought very close to the hollow section, which is favorable with regard to force ratios, particularly in the case of a vertical or oblique installation position of the hollow section, and reduces the overall height. The possibility of connecting the hollow section by another of its sides with a connecting structure remains substantially unrestricted.

The longitudinal toothed rack may be fastened to the hollow section by means of a fastening groove in the side to which it is fastened.

Fouling of the longitudinal toothed rack and of the toothed wheel by chips and other particles of dirt must be expected, particularly in the vicinity of machine tools with which cutting operations are performed. In addition, lubricant applied to the longitudinal toothed rack may be thrown toward the outside of the hollow section. The penetrating dirt particles may collect in the lubricant, interfere with smooth tooth engagement between the longitudinal toothed rack and the toothed wheel and lead to wear on the teeth of the toothed wheel and on the longitudinal toothed rack. Effective protection against such fouling can be obtained by encapsulating the longitudinal toothed rack and the teeth of the toothed wheel by an encapsulating arrangement.

Encapsulation may consist, first of all, in a cover part surrounding the toothed wheel. However, in order also to protect the full length of the longitudinal toothed rack against fouling, it is proposed that the encapsulating structure comprise a cover band for the longitudinal toothed rack, which band extends between the two ends of the longitudinal toothed rack, spaced apart in the direction of the longitudinal axis, over the toothed wheel in its region distant from the region of engagement with the longitudinal toothed rack. The cover band advantageously is held by holding means, in the direction of the longitudinal axis, in front of and behind the toothed wheel in each instance, in proximity to the longitudinal toothed rack.

The cover band may rest in a sliding relationship directly on the toothed wheel in its peripheral region distant from the region of engagement with the longitudinal toothed rack. At the same time, it may, but need not, rest on the teeth of the toothed wheel. In particular, the latter arrangement is possible when the cover band consists of a wear-resistant material, for example, a thin steel band. When less abrasion-proof materials are used for the cover band, it is possible to have the cover band run over a supporting surface which is arranged for common linear movement with the toothed wheel and is adjacent to the toothed wheel in its peripheral region diametrically opposite the region of engagement with the longitudinal toothed rack. Then, the cover band could be made, for example, of a band of woven fabric or a flexible band of a synthetic material. However, it is understood that in the latter case, a steel band is alternatively possible.

As an alternative to the embodiment above, a cover band closed into a loop, which is reversed at both ends of the longitudinal toothed rack, spaced apart in the direction of the longitudinal axis, by band-reversing means and is carried back on the back side of the longitudinal toothed rack distant from the engagement with the toothed wheel, may be provided for the longitudinal toothed rack. It is then possible to connect the cover band firmly with a cover part, arranged for common movement with the toothed wheel, which covers the teeth of the toothed wheel at least in its peripheral region remote from the engagement with the longitudinal toothed rack. The side edges of the cover band may be guided on the side of the longitudinal toothed rack that faces toward the toothed wheel in band guide slots parallel to the longitudinal toothed rack. Lastly, it is especially advantageous, with regard to protected accommodation of the cover band, if the latter travels on the back side of the longitudinal toothed rack in a band-return channel closed or sealable all around.

A structurally simple accomplishment, particularly beneficial for effective encapsulation, consists in that the longitudinal toothed rack is accommodated in a longitudinal toothed rack channel open toward the toothed wheel and the cover band bridges the opening region of the said longitudinal toothed rack channel. In addition, the encapsulation may be supplemented by encapsulating walls which are arranged axially on either side of the toothed wheel, substantially orthogonal to the axis of the toothed wheel, and are in communication with the longitudinal toothed rack and the cover band. Such encapsulating walls may be made of a special cover part, but alternatively of the hollow section wall or a gear unit or motor housing.

The proposal to design the hollow section for the elective addition of at least two different linear drive units, in particular for the addition of a linear drive unit with flexible traction means or a linear drive unit with a drive spindle or a linear drive unit with a piston-cylinder unit or a linear drive unit in the form of a toothed drive unit, is likewise based on the idea of procuring a versatile linear guide module. In a linear drive unit with a piston-cylinder unit a cylinder is arranged stationary relative to the hollow section, while a rodless piston guided in the cylinder is connected for common movement with the runner assembly. The said connection may, for example, consist in that the piston is designed with a nose, projecting radially outward, which is connected through a longitudinal slot of the cylinder with the runner assembly. Another possibility is to connect the runner assembly to the piston by magnetic force. In this case, the piston will be magnetic and the runner assembly will consist at least partially of ferromagnetic material.

A hollow section, which has a primary inner chamber arranged eccentric to the wall distant from the rails, is set back in the center region of its wall near the rails toward the primary inner chamber and has at least one fastening groove on one of its side walls or the wall distant from the rails may, for example, meet the above requirement for elective pos-sible addition of various linear drive units, here a drive unit with flexible traction means or a drive unit with a drive spindle or a toothed drive unit.

For use of the linear guide unit as a component of a multiple-member movement system whose members comprise a base, an object holder and, if desired, intermediate members between base and object holder, where the members, starting from the base, which has a minimal number of degrees of freedom, all the way up to the object holder, which has a maximum number of degrees of freedom, have an increasing number of degrees of freedom, a structural principle according to which, of the two structural units of the linear guide unit movable relative to one another, one of which comprises the runner assembly and the other the hollow section, the structural unit lighter in weight has a greater degree of freedom and the structural unit heavier in weight has a smaller degree of freedom, has proven to be advantageous with regard to force and energy ratios.

According to this structural principle, therefore, in execution of the linear guide unit with a toothed drive unit, that structural unit which comprises the runner assembly, the drive motor, the toothed wheel and, optionally, the gear unit, will have a smaller degree of freedom than the other structural unit, which comprises the hollow section and the longitudinal toothed rack. In this connection, the invention proceeds from the assumption normally made in practice that the structural unit comprising the hollow section is lighter than the structural unit with the runner assembly, motor, toothed wheel and, optionally, the gear unit. However, should the hollow section be very heavy, in some cases the structural unit comprising the hollow section will be installed with the smaller number of degrees of freedom.

Generally, for the case of a hollow section provided with a smaller number of degrees of freedom than the base, a linear drive unit with flexible traction means or with a drive spindle or with a piston-cylinder unit will be used, while for the case that the runner assembly is to have a smaller number of degrees of freedom than the base, a toothed drive unit will be selected. In this way, the lighter part of the linear guide unit is driven with correspondingly little expenditure of force and energy. If the above structural principle is followed, an optimal accomplishment from the viewpoint of energy is obtained, even in complex movement systems with a multiplicity of degrees of freedom. Now, a special advantage of the invention lies in that a linear guide unit is made available which is suitable for combination with a wide variety of linear drive units, where there is always the possibility of following the above structural principle.

The use of a toothed drive unit as linear drive unit is of importance with regard to the masses to be moved, especially where the hollow section is to be displaceable in a vertical direction with respect to the runner.

It is understood that the linear guide unit may be designed not only with a single linear drive unit but that, alternatively, at least two runner assemblies, each with a linear drive unit and movable independently of one another in the axial direction of the hollow section, may be carried on the rail system. In this connection, the use of toothed drive units is particularly favorable. Then, at least two runner assemblies, capable of being driven independently of one another and with a toothed wheel, a drive motor and optionally a gear unit in each instance, may be associated with a hollow section, where the toothed wheels each mesh with a separate longitudinal toothed rack (for example, in runner assemblies carried on different guide rails) or with a common longitudinal toothed rack (for example in two runner assemblies carried successively on the rail system). However, it is alternatively possible to use unlike linear drive units, for example, to drive one runner assembly with a toothed drive unit and an additional runner assembly by means of a flexible traction drive. In addition, it is possible to combine a toothed drive unit with, for example, a linear drive unit with flexible traction drive for driving one and the same runner assembly, in order to obtain load relief with heavy masses.

According to another aspect of the invention, a linear guide unit comprises an elongated member and a runner assembly which is carried on a first longitudinal surface of the elongated member and is capable of being driven by a toothed drive unit in the direction of the longitudinal axis of the elongated member. The toothed drive unit includes a longitudinal toothed rack, which extends in the direction of the longitudinal axis of the elongated member and is substantially rigidly connected with the elongated member, and a rotary drive unit, which is mounted on the runner assembly and drives a toothed wheel. The toothed wheel meshes with the longitudinal toothed rack and has a wheel axis oriented substantially parallel to the first longitudinal surface and substantially orthogonal to the longitudinal direction of the elongated member.

Such a linear guide unit is disclosed in, for example, DE 88 02 615 U1. The rotary drive unit of the linear guide unit proposed in DE'615 is integrated into the runner assembly and is arranged above the first longitudinal surface of the elongated member. This leads to great overall height of the runner assembly and consequently of the linear guide unit as a whole.

In contrast, the invention provides that the rotary drive unit is arranged at a lateral distance apart from a second longitudinal surface of the elongated member substantially orthogonal to the first longitudinal surface and adjoining the first longitudinal surface, and that the toothed wheel as well as the longitudinal toothed rack are arranged between the second longitudinal surface of the elongated member and the rotary drive unit. This permits locating the rotary drive unit, as well as of an object to be clamped on the runner assembly, in close proximity to the elongated member. This is favorable with regard to the force ratios in the drive of the runner assembly.

The above arrangement is particularly favorable with regard to the possibility of encapsulating the toothed surface and the teeth of the toothed wheel by encapsulating means, in particular encapsulating means of the type described above. Then a lateral encapsulating wall may be arranged on the side of the toothed wheel that faces away from the second longitudinal surface, which is formed in simple fashion on a supporting structure supporting the rotary drive unit and connected with the runner assembly or/and by a sealing wall of the rotary drive unit turned toward the second longitudinal surface. A lateral encapsulating wall, which is formed by the second longitudinal surface of the elongated member or/and on a supporting structure connected with the runner assembly and supporting the rotary drive unit, similarly may be provided on the side of the toothed wheel that faces toward the second longitudinal surface.

The longitudinal toothed rack may alternatively be arranged on the side of the toothed wheel that faces toward or faces away from the first longitudinal surface.

For a better understanding of the invention, reference may be made to the following description of exemplary embodiments, taken in conjunction with the accompanying drawings.

DESCRIPTION OF THE DRAWINGS

FIG. 7 is a side elevational view of another embodiment of a linear guide unit;

FIG. 8 is a fragmentary end cross-sectional view of a shrouding section with a toothed rack and cover band of the embodiment of FIG. 7;

DESCRIPTION OF THE EMBODIMENTS

Figure 1:
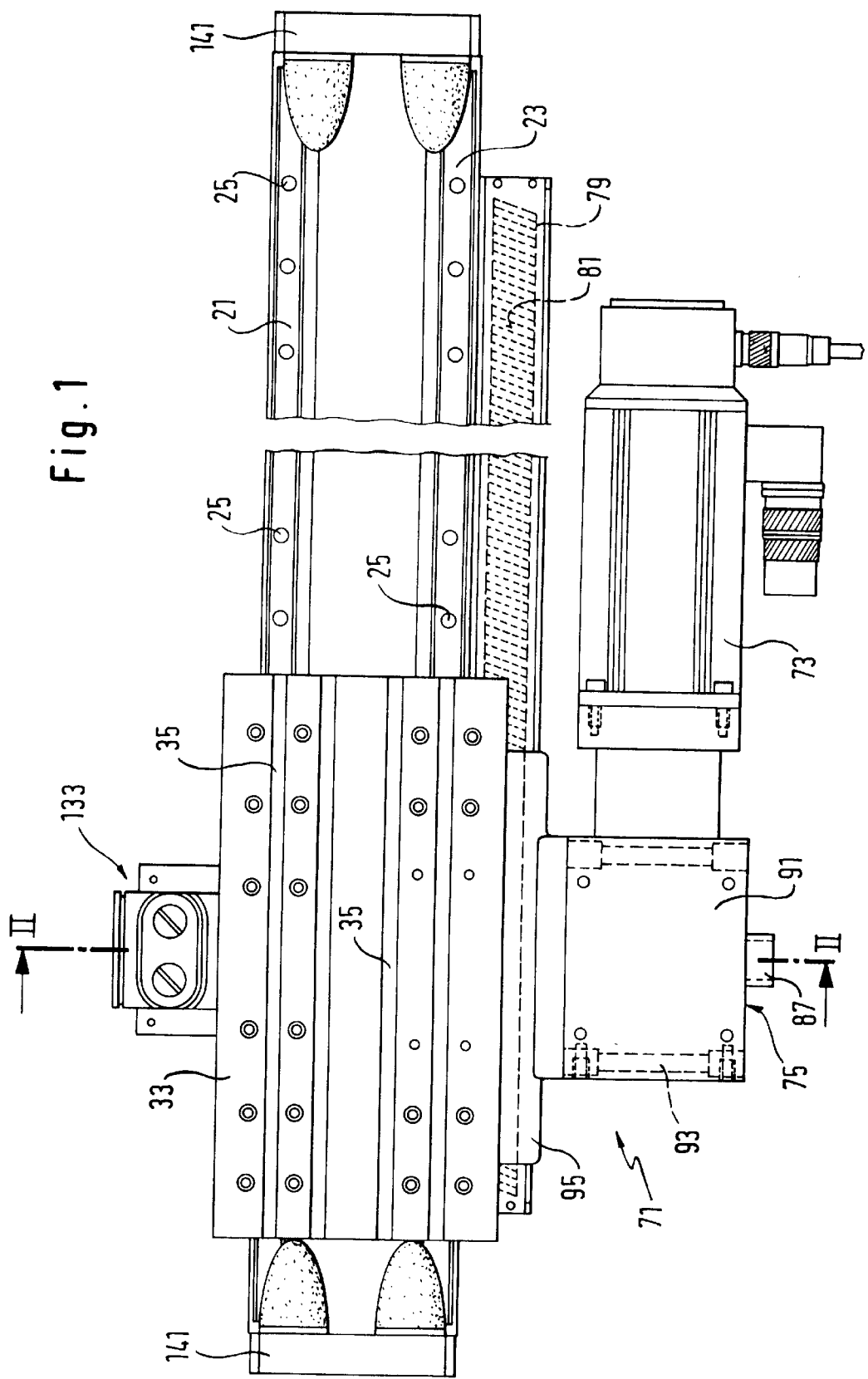
FIG. 1 is a top plan view of a linear guide unit according to the invention.
Figure 2:
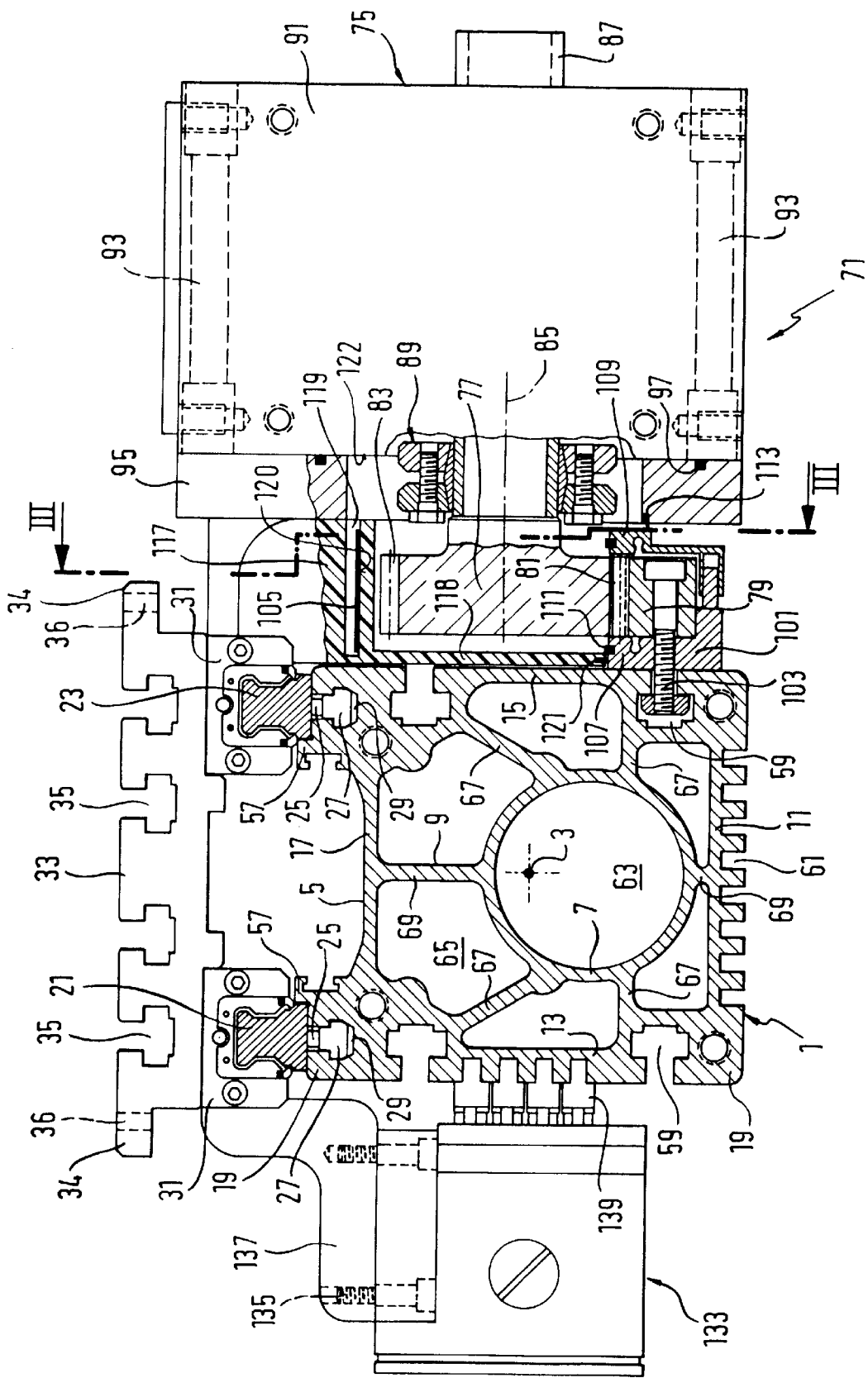
FIG. 2 is an end cross-sectional view taken generally in the region of the lines II—II of FIG. 1.
Figure 3:
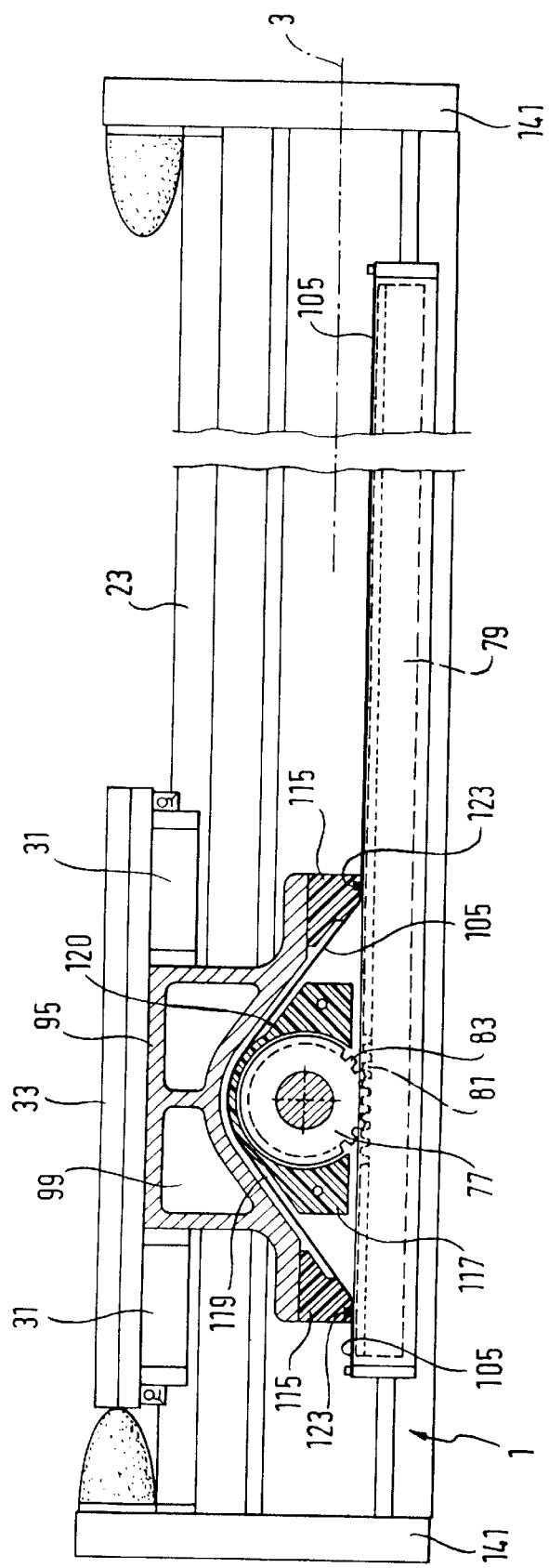
FIG. 3 is a side cross-sectional view taken generally along the lines III—III of FIG. 2.

Reference is made first to FIGS. 1 to 3. An elongated hollow section, produced as an extruded section, is labeled 1. The hollow section 1 preferably is made of light metal, for example, aluminum. It has a longitudinal axis 3 and a substantially rectangular cross section, which can be seen particularly in FIG. 2.

The hollow section 1 comprises an outer wall 5 and an inner chamber wall 7, as well as a plurality of bracing ribs 9, which run approximately radially and connect the inner chamber wall 7 with the outer wall 5. The outer wall 5 includes a bottom wall 11, two side walls 13 and 15, and a top wall 17. These walls 11, 13, 15 and 17 form the rectangular sides of the hollow section 1 and are joined together in thickened corner regions 19. On the outer side of the top wall 17, two guide rails 21 and 23 are fastened in their associated corner regions 19 by bolts 25, which pass through the respective guide rails 21, 23 and are secured by holding elements 27, here threaded nuts, which are inserted in undercut T grooves 29 on the outer side of the top wall 17. As can be seen in FIG. 1, a plurality of bolts 25, distributed at approximately equal intervals along the longitudinal axis 3, is in each instance provided for fastening of the guide rails 21, 23.

Two runners 31 are guided for displacement on each guide rail 21, 23. The method of guidance is described below in connection with FIG. 4. A bridge unit in the form of a table 33 spans the two guide rails 21, 23 and is firmly connected with the total of four runners 31. A plurality of undercut T-section grooves 35 is provided in the top of the table 33. An object to be moved, for example, a tool or a measuring device, may be fastened to the table by means of the said T-section grooves 35; but, on the other hand, the table may alternatively be fastened to a stationary base system if the hollow section 1 is to be moved relative to the base system.

Figure 4:
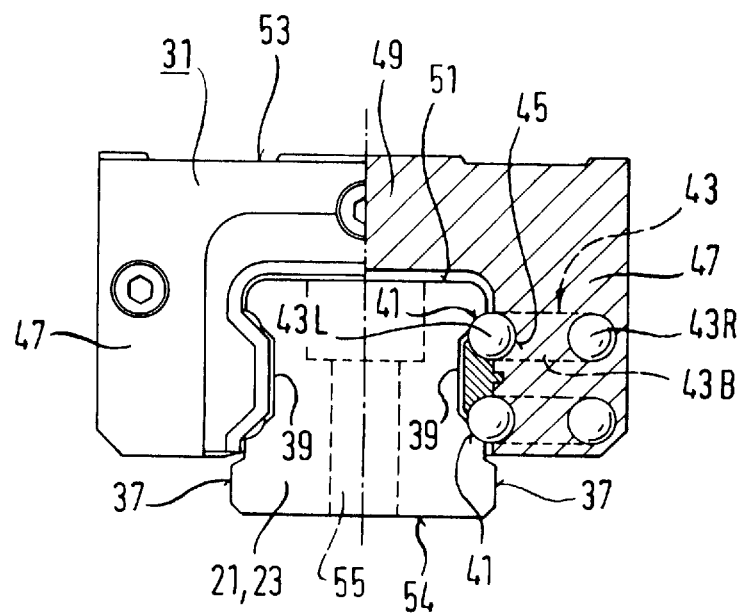
FIG. 4 is a fragmentary partial cross-sectional view of a runner and an associated guide rail.

For a clearer illustration of how the runners 31 are carried by the associated guide rails 21, 23, reference may be made to FIG. 4. The guide rails 21, 23, have a groove 39 in each of their two side faces 37. Two load-bearing raceways 41 are provided in each of the flanks of the grooves 39. A total of four ball circuits 43 (two associated with each flank) is accommodated in each runner 31. Each ball circuit 43 consists of a load-transmitting race 43L, a return race 43R and two bend races 43B. The load-transmitting race 43L of each ball circuit 43 is in engagement with one of the load-bearings raceways 41 of the guide rails 21, 23 and in engagement with a load-bearing raceway 45 of the runner 31. It is understood that, instead of balls, other rolling members, for example, barrel-shaped rollers, may alternatively be used.

Each runner 31 is U-shaped, having two arm parts 47, one of which lies adjacent a corresponding side face 37 of the respective guide rails 21, 23. The arm parts are joined by a rib portion 49. The rib portion 49 lies near a head face 51 of the respective guide rail 21, 23. The return races 43R and the bend races 43B are carried to the ball circuits 43 in the arm parts 47. On the upper side of their rib portion 49, the runners 31 have a connecting surface 53, on which the table 33 may be mounted. Fastening may be effected, for example, by connecting screws which are screwed into threaded bores in the connection surface.

The U shape of the runners results, for one thing, in high stability with great carrying capacity and, for another, in a very narrow linear guide unit in which, despite the arrangement of the guide rails 21, 23 in the corner regions of the top wall 17, the runners 31 and hence also the table 33 project only slightly beyond the side walls 15.

Also seen in FIG. 4 is a fastening hole 55, which passes through the guide rails 21, 23 and accepts the bolts 25. The guide bolt 21, 23, by means of the bolts 25, are fastened to the top wall 17 by one of the fastening surfaces 54 opposite the head face 51.

Contact shoulders 57, projecting outward from the top wall 17, on which the respective side faces 37 of the guide rails 21, 23 rest, can be seen in FIG. 2. This results in precise alignment of the guide rails 21, 23. In addition, the hollow section 1 has two additional under-cut T-section grooves 59 on each of its two side walls 13 and 15, as well as a plurality of rectangular grooves 61 on the side wall 13 and the bottom wall 11 in each instance. The top wall 17 is slightly set back toward the inner chamber wall 7, producing an enlarged free space between the table 33, the runners 31 and the top wall 17. A circular primary inner chamber 63, delimited by the inner chamber wall 7, is arranged eccentrically with respect to the longitudinal axis 3 closer to the bottom wall 11. The bracing ribs 9 delimit additional secondary hollow chambers 65 about the primary inner chamber 63. The bracing ribs 9 are distributed so that a corner rib 67 runs from the inner chamber wall 7 to each corner region 19 of the hollow section 1 (in the illustrated embodiment, the corner ribs 67 do not run exactly radially, but may be regarded as running approximately radially), and one center rib 69 each runs from the inner chamber wall 7 to the bottom wall 11 and to the top wall 17. Particularly in the case of relatively strong eccentricity of the inner chamber 63, the center rib 69 may be greatly shortened or even substantially merged with the bottom wall 11.

The linear guide unit additionally is equipped with a linear drive unit 71. In the illustrated example, the drive unit 71 is a toothed drive unit and in particular comprises an electric drive motor 73, a gear unit 75 connected downstream of the drive motor 73 on the power take-off side and a toothed wheel or pinion 77 arranged at the output of the gear unit 75, as well as a toothed rack 79 meshing with the pinion 77. The toothed rack 79 has a toothed surface 81, which is in engagement with the peripheral teeth 83 of the pinion 77. The drive motor 73, the gear unit 75 with the pinion 77, and the toothed rack 79 are arranged alongside the side wall 15 of the hollow section 1, specifically, so that they do not project or project only insignificantly out beyond the runners 31 or—if present—the table 33. At the same time, the pinion 77, with pinion axis 85 approximately perpendicular to the side wall 15, lies approximately central to the side wall 15 and by means of a clamping arrangement 89 is affixed against rotation to a gear shaft 87. A gear housing 91 has fastening holes 93 for fastening bolts, not shown, by which the gear housing 91 is capable of attachment to a cover housing 95. The cover housing 95 covers the pinion 77 and the section of the toothed rack 79 in engagement with it and provides protection against penetrating particles of dirt, chips and the like. An annular seal 97 is inserted between the cover housing 95 and the gear housing 91. The cover housing 95 is capable of firm connection, in a manner not illustrated in detail, with the right-hand runner 31 in FIG. 2 or alternatively with the table 33, so that the motor 73, the gear unit 75 and the pinion 77 are connected with the runners 31 for common movement. For reasons of weight, the cover housing 95 advantageously will consist of synthetic material or light metal and, for additional weight reduction, may have hollow spaces 99 (see FIG. 3).

The toothed rack 79 is received in a trough-like shrouding section 101. The rack 79 and section 101 together are fastened to the hollow section 1 by fastening bolts 103 that pass through them and thread into nuts received in the lower T-section groove 59 at the outer side of the side wall 15. The shrouding section 101 may be in one piece or may consist of a plurality of parts. In the illustrated embodiment it has an approximately U shape in cross section. It consists preferably of aluminum, although other materials, in particular synthetic material, are alternatively possible.

A steel cover band 105, which extends over the entire length of the toothed rack 79 and is fixed at its ends, completely covers the upper side of the toothed rack 79, i.e., its toothed surface 81. It is slightly wider than the opening of the shrouding section 101 between its two lateral arms 107 and 109. Magnetic strips 111 inserted into the upper edges of the two arms 107, 109 pull the steel cover band 105 into engagement with the shrouding section 101 and so produce tight encapsulation of the toothed rack 79. The cover band 105 may alternatively travel in guide channels of the edges of the opening. It is possible for the cover band 105 to be slipped into such guide channels. A longitudinal seal 113, for example a sealing strip of felt, is provided between the outer side of the arm 109 of the shrouding section 101, on the right-hand side in FIG. 2, and the cover housing 95, the said longitudinal seal 113 being held on the cover housing 95.

It can be seen in FIG. 3 that the cover band 105 is lifted into a loop over the pinion 77, being pressed in the longitudinal direction of the toothed rack 79, in front of and behind the pinion 77, by holding blocks 115 against the magnetic strips 111. When the cover band 105 travels in guide channels of the shrouding section 101 or is slipped in there, the blocks 115 are capable of lifting the cover band 105 out of the channels and reinserting the cover band 105 into the channels on either side of the pinion 77, and the shrouding section 101 may then have an elastically yielding region or the cover band 105 may consist of elastically yielding material. A reversing member 117 carries, in a guide slot 119 lying on the side of the pinion 77 distant from the toothed rack, the cover band 105 frictionless on a supporting surface 120 over the pinion 77. The reversing member 117 may be designed in one piece with the holding blocks 115. It may be held on the cover housing 95 as a separate part, preferably a part of synthetic material, by, for example, being inserted into a recess of the cover housing 95 provided for the purpose. However, a one-piece design of the reversing member 117 with the cover housing 95 is alternatively possible. On the side of the pinion 77 distant from the gear unit, the reversing member 117 has a first encapsulating wall 118, running parallel to the side wall 15, which is sealed off from the shrouding section 101 by an additional seal 121. The said first encapsulating wall 118 prevents lubricant from being thrown from the toothed rack 79 onto the side wall 15 of the hollow section 1. An additional, second encapsulating wall 122 is formed by the gear housing 91 on its side facing toward the pinion 77. Lastly, in each of the holding blocks 115 there is inserted a sealing strip 123, which runs transverse over the cover band 105 and bridges the region between the seal 121 and the seal 113.

The cover housing 95 with its encapsulating wall 118, the holding blocks and the reversing member 117, the shrouding section 101, the cover band 105, the gear housing 91 with its encapsulating wall 122 and the seals 97, 113, 121 and 123 completely encapsulate the toothed rack 79 and the pinion 77, providing effective protection against the penetration of particles of dirt, chips and other contaminants on the one hand and, on the other, reliably preventing escape of lubricant from the toothed side.

In order to define the position of the hollow section 1 relative to the runners 31 or the table 33, limit or proximity switches may be used. In the embodiment of FIGS. 1 to 3, a limit-switch assembly 133 (see FIG. 1, left side) is arranged laterally adjacent to the side wall 13 of the hollow section 1 for this purpose. It is fastened by fastening screws 135 to a angle bracket 137, which is firmly mounted on the left runner 31 in FIG. 2. The limit-switch assembly 133 has a plurality of feeler fingers 139, which engage in the rectangular grooves 61 provided in the side wall 13. The limit switches may be mechanical switches or, alternatively, inductive switches.

Figure 5:
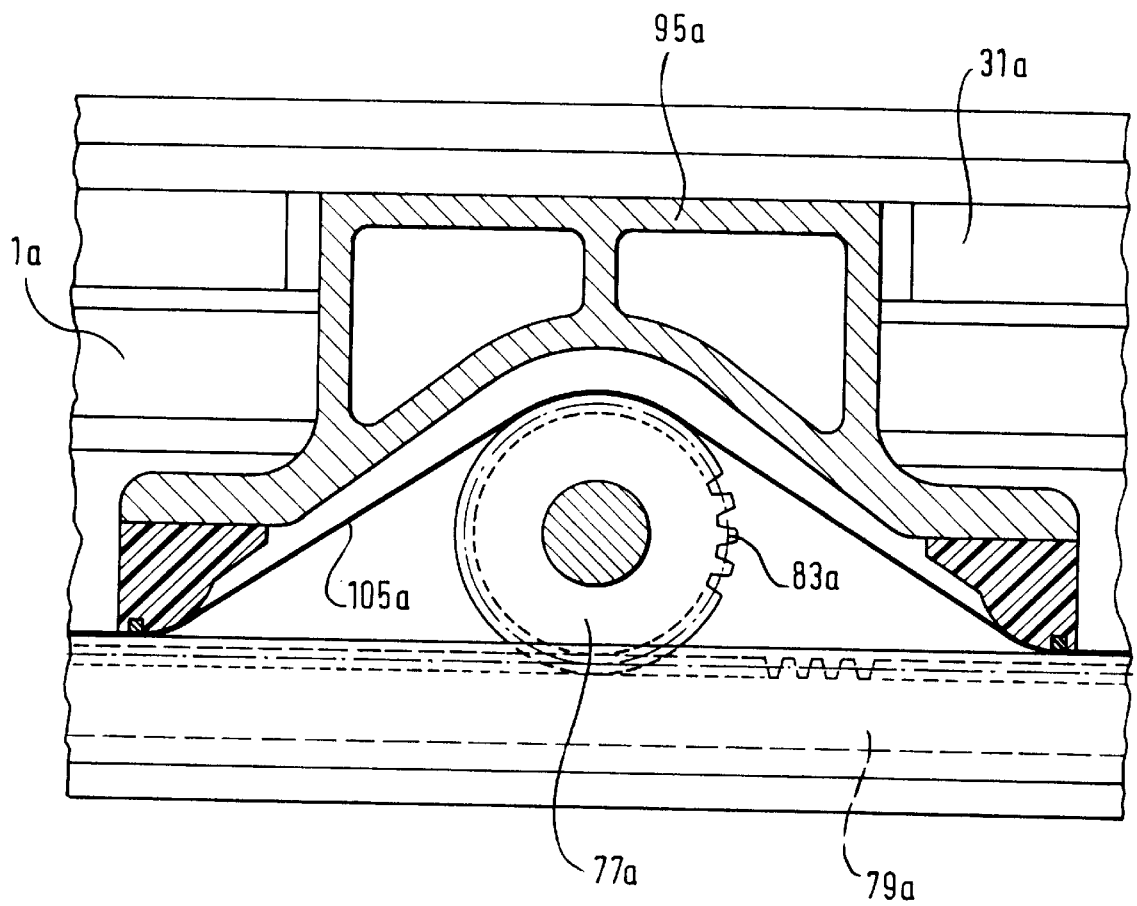
FIG. 5 is an enlarged, side cross-sectional view of a variation of the linear guide unit.
Figure 9:
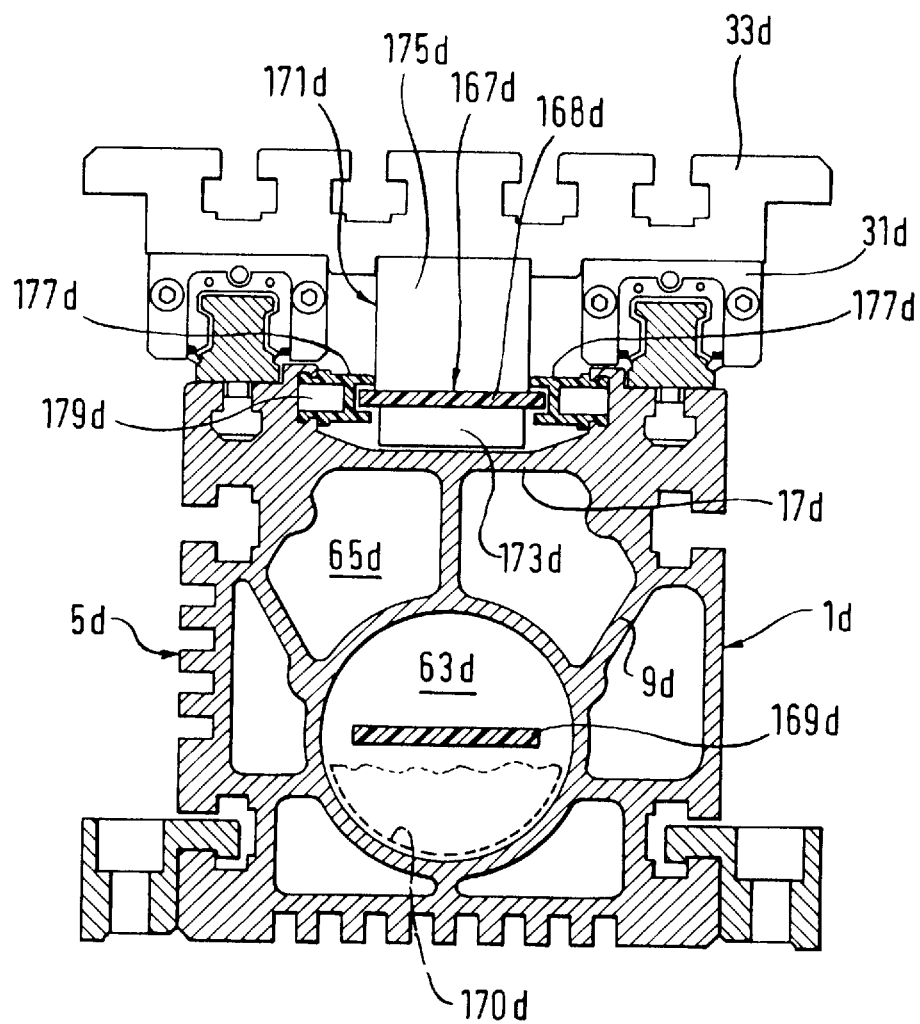
FIG. 9 is an end cross-sectional view of another embodiment of the linear guide unit.

FIGS. 5 and 9 show variations of the linear guide unit of FIGS. 1 to 4. Like or like-acting components there are provided with the same reference numerals as before, but supplemented by a lower-case letter. Unless these components are explained anew, reference is made to the preceding description.

In the embodiment shown in FIG. 5, no reversing member is provided for guidance of the cover band 105a on the side of the pinion 77a remote from the toothed rack. Rather, here the cover band 105a slides directly on the pinion 77a. Accordingly, it will be made of a wear-resistant material, in particular of steel. Bands of synthetic material or woven fabric are not excluded, but rather are candidates for the embodiment of FIGS. 1 to 4.

Figure 6:
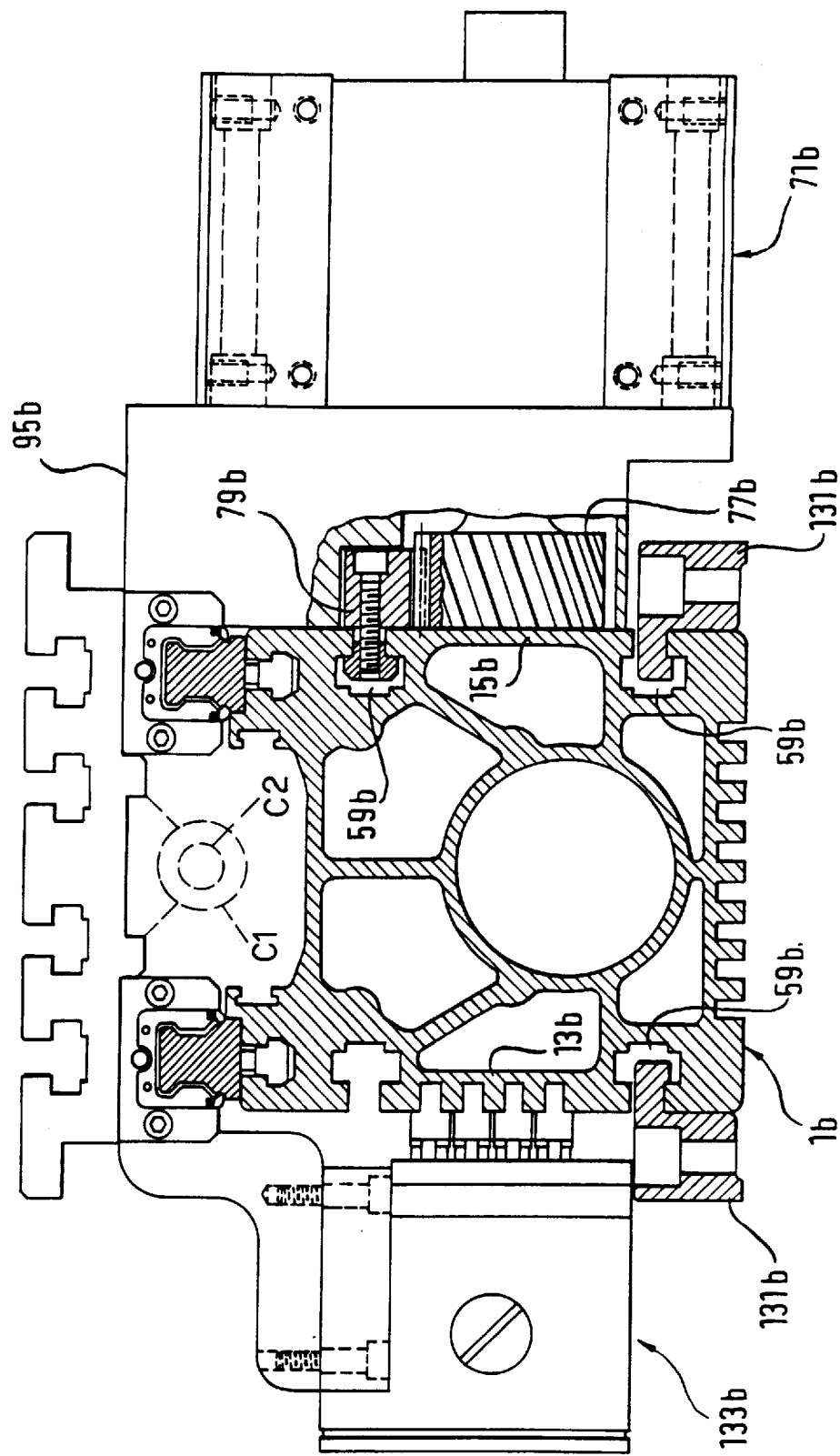
FIG. 6 is an end cross-sectional view of another variation of the linear guide unit.

In the embodiment of FIG. 6, the toothed rack 79b is fastened at the upper T groove 59b of the side wall 15b above the pinion 77b. A clamping shoe 131b, by means of which the hollow section 1b may be fixedly clamped on a base structure, engages in the lower T groove 59b of the two side walls 13b, 15b of the hollow section 1b in each instance. The encapsulating means of the above embodiments up to the cover housing 95b are not shown in FIG. 6.

FIG. 7 shows an embodiment wherein the two ends 145c of the cover band 105c are fastened to the cover housing 95c. Starting from the cover housing 95c the band 105c leads to the two ends of the toothed rack 79c, is reversed at the ends by band-reversing rollers 147c and extends back on the underside of the toothed rack 79c. In contrast to the embodiments described above, here the cover band 105c does not travel over the pinion 77c, but is drawn along as a closed tape loop by the cover housing 95c upon movement of the runners 31c or the table 33c. Accordingly, it does not require holding blocks or a reversing member for guidance of the cover band 105c in the region of the pinion 77c. Covering of the pinion 77c is effected in radial direction by the cover housing 95c. In addition, the cover housing 95c, referred to the pinion axis, may have axial encapsulating walls on at least one side of the pinion, as are present in the embodiment of FIG. 2 in the form of the encapsulating wall 118, formed by the reversing member 117, and the encapsulating wall 122, formed by the gear housing 91.

FIG. 8 shows the guidance of the cover band 105c in the shrouding section 101c in the embodiment of FIG. 7. The U-shaped shrouding section 101c is made up of two assemblable section parts 149c and 151c, which upon assembly are capable of snapping into a variety of catch positions (namely the position represented in FIG. 8, as well as a position indicated by the broken line at 153c), so that a variety of opening widths of the shrouding section 101c is adjustable for various sizes of toothed racks, as required.

The section part 149c forms the side arm 107c of the shrouding section 101c, as well as a section rib 155c. The section part 151c forms the other side arm 109c of the shrouding section 101c. Each of the two arms 107c, 109c has a band-guide slot 157c in its inner face, the slots 157c being located opposite each other and receiving the side edges of the cover band 105c. It can be seen that in this way the toothed rack 79c inserted into the shrouding section 101c is encapsulated all around. The cover band 105c is carried, by its part returning on the underside of the toothed rack 79c, in a band-return channel 161c in the section rib 155c of the shrouding section 101c. Since the said band-return channel 161c is closed only upon assembly of the two section parts 149c, 151c, the cover band 105c may be inserted into the slot-like partial channel 163c formed in the rib 155c of the section part 149c ahead of time and need not be fed through the band-return channel 161c.

In FIG. 8, lastly, notches 165c, running longitudinally, which are provided approximately underneath the band-guide slots 157c in the inner faces of the arm 107c, 109c and face each other, can also be seen in the two arms 107c, 109c of the shrouding section 101c, which preferably is an extruded section of light metal or synthetic material. End cover plates may be screwed by means of the said notches 165c to the ends of the shrouding section 101c, the screws engaging in the notches 165c.

In the above-described embodiments, the linear drive unit is a toothed drive unit. However, other linear drive units may alternatively be used equally well. This includes in particular a drive having a flexible traction means, a spindle drive or alternatively a piston-cylinder drive.

FIG. 9 shows, in section, a linear guide unit having a drive which comprises a flexible traction means 167d starting from the runners 31d or the table 33d and carried to the two ends of the hollow section 1d. The traction means 167d may be a belt (including a toothed belt), a wire or a cable. It travels with a forward-moving end piece 168d on the outer side of the setback region of the cover wall 17d, specifically, so that it does not project substantially beyond the rectangular periphery of the hollow section 1d. At the ends of the hollow section 1d it is reversed, for example by reversing rollers. A backward-moving end piece 169d of the traction means 167d travels within the primary inner chamber 63d, optionally alternatively in one of the other hollow chambers 65*d*, between the opposing reversing rollers. The end plates 141 closing off the hollow section 1 at the end in FIGS. 1 and 3 may be replaced by modular reversing housings in which the reversing rollers are accommodated.

The ends of the traction means 167*d* are fixed to the table 33*d* by means of a clamping device 171*d*. The clamping device 171*d* comprises two clamping blocks 173*d* and 175*d*, which are clamped together by clamping means, for example screws (not shown). The upper clamping block 175*d* is firmly connected to the under-side of the table. On the cover wall 17*d* the edges of the traction means 167*d* are guided in H-section strips 177*d*, which are inserted in corresponding holding grooves 179*d* provided on the facing wall regions of the setback of the cover wall 17*d*.

Drive of the traction means 167*d* may be effected in a variety of ways. A drive motor, in particular an electric motor, which drives the respective reversing roller and hence the traction means 167*d*, may be mounted on one of the reversing modules. Alternatively, drive may be effected by a piston 170*d*, movable pneumatically or hydraulically and traveling in the inner chamber 63 or optionally in another hollow chamber 65. In this case, the ends of the traction means 167*d* are fastened to the piston 170*d*. The piston 170*d* separates two working chambers in the inner chamber 63*d* from one another, which chambers are provided with pressure-medium connections and are connected by a control mechanism to a pressure-medium source.

In a spindle drive, which preferably is designed as a screw drive, in particular a ball screw drive, a spindle shown in phantom in FIG. 6 is supported for rotation on the end plates 141 and extends through the space delimited by the table 33, the runners 31 and the cover wall 17. Because of the indentation of the cover wall 17 this space is sufficiently great to accommodate a nut member shown in phantom in FIG. 6 firmly connected to table 33 or the runners 31, which is in engagement with the spindle. A motor mounted on one of the end plates drives the spindle.

Alternatively, in a piston-cylinder drive, the space present underneath the table may be used for the accommodation of a cylinder in which a piston-rodless piston is received for longitudinal movement. The piston is in drive communication with the table 33 or the runners 31 by magnetic coupling or mechanical connection.

The form of linear drive unit that will be selected will depend upon the particular application. For example, as shown schematically in FIG. 10, on a first linear guide unit L1, which is positioned substantially horizontally, there is held a second linear guide unit L2, specifically, in such fashion that the two tables 33 of two linear guide units L1, L2 are firmly connected together by means of a 90° angle bracket 143. The hollow section 1 of the linear guide unit L2 accordingly is vertically displaceable in relation to the table 33 of the linear guide unit L1. Since it is advantageous to make the displaceable part of each linear guide unit as low in weight as possible, the linear guide unit L2 will be designed with a toothed drive unit. Then the hollow section 1 of the linear guide unit L2 basically has to carry only the toothed rack of the toothed drive unit, while the heavier assembly of drive motor, gear unit and toothed wheel is supported on the table 33 of the linear guide unit L2, stationary relative to the table 33 of the linear guide unit L1. In contrast, the linear guide unit L1 will be equipped with a drive having flexible traction means or a drive spindle or with a piston-cylinder drive, since its table 33 is to be driven and, in the case of the types of drive mentioned, has to carry a smaller weight.

Figure 10:
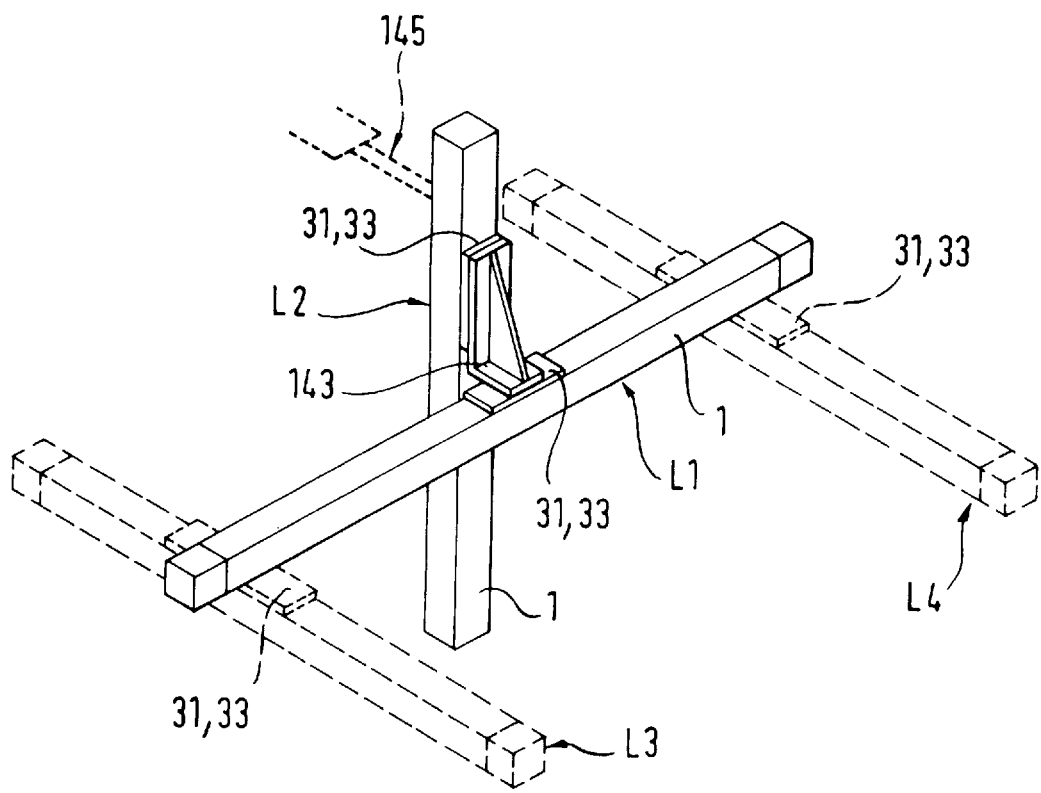
FIG. 10 is a perspective view of a plurality of linear guide units combined as modules for the multidimensional guidance of a holder.

Indicated by dashed lines in FIG. 10 is the case in which the hollow section 1 of the linear guide unit L1 is fastened by its ends to the tables 33 of two additional linear guide units L3 and L4 and, in this way, has an additional degree of freedom of movement. The linear guide units L3 and L4 alternatively are advantageously equipped with a drive having flexible traction means or with a spindle drive or with a piston-cylinder drive. With such a modularly assembled guide a tool holder 145 of an automatic handling machine, indicated by dashed lines, for example, may be driven in three directions orthogonal to one another. Because the hollow section 1 of the linear guide unit according to the invention is designed for the elective addition of a variety of linear drive units, a user is able to construct a customized guide for himself in modular fashion.

It should be added, in connection with FIG. 2, that the table 33 has lateral projections 34 which project beyond the hollow section 1 in the lateral direction. In these projections 34 there are provided bores 36, indicated by broken lines, by means of which the linear guide unit shown, with an object to be supported on the table 33, may be bolted from the bottom, i.e., from the side of the hollow section 1. This fastening possibility is advantageous particularly when large connecting parts or objects are involved.

We claim:

1. A linear guide unit, comprising:

an elongated member having a longitudinal axis and a generally rectangular external cross section, first and second longitudinal external side surfaces of said elongated member being adjacent each other and generally perpendicular to each other;

at least one runner assembly carried by the elongated member over the first side surface for movement relative to the elongated member parallel to the longitudinal axis;

a toothed drive means for moving the runner assembly relative to the elongated member, the toothed drive means including a longitudinal toothed rack connected to the second side surface of the elongated member and extending parallel to the longitudinal axis of the elongated member, said toothed rack including a plurality of teeth having a root-to-tip orientation generally parallel to said second side surface, said toothed drive means further including a toothed wheel carried by the runner assembly and meshing with the teeth of the longitudinal toothed rack and having a wheel axis substantially perpendicular to the second side surface of the elongated member;

a rotary drive unit for rotatably driving the toothed wheel about said wheel axis, the rotary drive unit being connected to the runner assembly for common linear movement therewith along said longitudinal axis and positioned next to and spaced apart from the second side surface of the elongated member in the direction of said wheel axis so as to define a space between said second side surface and the adjacent side of said rotary drive unit;

the toothed wheel and the longitudinal toothed rack both being positioned in the space between the rotary drive unit and the second side surface of the elongated member, with a gap in the axial direction of said wheel axis between said second side surface and the adjacent side of said toothed wheel; and means for encapsulating the teeth of the longitudinal toothed rack and the teeth of the toothed wheel, the encapsulating means including a first lateral encapsulating wall generally parallel to the second side surface of the elongated member and located within said gap between the second side surface and the toothed wheel, said wall being part of a cover structure covering the toothed wheel and connected to the runner assembly for common linear movement therewith along said longitudinal axis.

2. A linear guide unit according to claim 1, wherein the encapsulating means further comprises a second lateral encapsulating wall on the side of the toothed wheel that faces away from the second side surface, which second wall is formed on the cover structure.

3. A linear guide unit according to claim 1, wherein the encapsulating means further comprises a second lateral encapsulating wall on the side of the toothed wheel that faces away from the second surface, which second wall is formed by a sealing wall of the rotary drive unit that faces toward the second side surface.

4. A linear guide unit according to claim 1, wherein the longitudinal toothed rack is positioned between the toothed wheel and a virtual prolongation of the first side surface.

5. A linear guide unit according to claim 1, wherein the toothed wheel is positioned between the longitudinal toothed rack and a virtual prolongation of the first side surface.

6. A linear guide unit according to claim 1, wherein the encapsulating means comprises a cover band for the longitudinal toothed rack, which band extends between the two ends of the longitudinal toothed rack, spaced apart in the direction of the longitudinal axis, over the toothed wheel in its peripheral region distant from the region of engagement of the toothed wheel with the longitudinal toothed rack.

7. A linear guide unit according to claim 6, further comprising means for holding the cover band in proximity to the longitudinal.

8. A linear guide unit according to claim 6, wherein the cover band rests in sliding relation directly on the toothed wheel in its peripheral region distant from the region of engagement of the toothed wheel with the longitudinal toothed rack.

9. A linear guide unit according to claim 6, wherein the cover band travels over a supporting surface which is formed on the cover structure and is adjacent to the toothed wheel in its peripheral region diametrically opposite the region of engagement with the longitudinal toothed rack.

10. A linear guide unit according to claim 1, wherein the encapsulating means comprises a cover band, formed into a closed loop, for the longitudinal toothed rack, which cover band is reversed at both ends of the longitudinal toothed rack spaced apart in the direction of the longitudinal axis by means for reversing said band and is returned on the back side of the longitudinal toothed rack distant from the engagement with the toothed wheel.

11. A linear guide unit according to claim 10, wherein the cover band is firmly connected with the cover structure and the cover structure covers the teeth of the toothed wheel at least in its peripheral region distant from the engagement with the longitudinal toothed rack.

12. A linear guide unit according to claim 10, wherein the side edges of the cover band are guided on the side of the longitudinal toothed rack that faces toward the toothed wheel in band guide slots running parallel to the longitudinal toothed rack.

13. A linear guide unit according to claim 10, wherein the cover band travels on the back side of the longitudinal toothed rack in sealed relation in a band-return channel.

14. A linear guide unit according to claim 1, wherein the longitudinal toothed rack is accommodated in a longitudinal rack-receiving channel that is open toward the toothed wheel, and a cover band bridges the open region of said longitudinal rack-receiving channel.

15. A linear guide unit according to claim 1, further comprising:
a rail system with at least two guide rails arranged outside on the elongated member with rail axes parallel to one another and to the longitudinal axis;
the runner assembly being carried for longitudinal displacement on the rail system;
the elongated member being an extruded hollow section having at least one fastening groove extending in the direction of the longitudinal axis, the fastening groove being located on the outer surface of the hollow section; and
the runner assembly having at least one U-shaped runner, which embraces an associated guide rail, and at least two rolling-member circuits integrated therein.

16. A linear guide unit according to claim 15, wherein:
each of the guide rails has a fastening surface, a head face remote from the fastening surface, and two side faces adjoining the head face; and
the at least one U-shaped runner has a transverse portion that is located adjacent to the head face of the associated guide rail and two arm portions connected by the transverse portion and located adjacent to the side faces of the associated guide rail.

17. A linear guide unit according to claim 16 wherein each of the side faces has at least one load-bearing raceway for a load-transmitting part of a respective rolling member circuit.

18. A linear guide unit according to claim 15, wherein:
the hollow section is generally rectangular in cross-section orthogonal to the longitudinal axis, having four walls and four corners; and
the guide rails are located on one wall proximate to the corners bordering that wall.

19. A linear guide unit according to claim 18, wherein:
a fastening groove for the fastening of fastening surfaces of each of the two guide rails is provided on the hollow section proximate to the corners of the wall to which the guide rails are fastened; and
at least one additional fastening groove is provided on at least one of the sides of the hollow section that adjoins the wall to which the guide rails are fastened.

20. A linear guide unit according to claim 19, wherein at least two fastening grooves are provided on at least one of the walls of the hollow section that adjoin the wall to which the guide rails are fastened.

21. A linear guide unit according to claim 18, wherein at least one secondary groove extending in the direction of the longitudinal axis is provided on at least one of the walls of the hollow section other than the wall to which the guide rails are fastened.

22. A linear guide unit according to claim 15, wherein the hollow section is a multiple-chamber hollow section with outer walls, a primary closed inner chamber defined by a surrounding inner chamber wall and bracing ribs connecting the inner chamber wall with the outer walls.

23. A linear guide unit according to claim 22, wherein:
the hollow section is generally rectangular in cross-section orthogonal to the longitudinal axis, having four walls and four corners;
the primary inner chamber is at a greater distance from a wall to which the guide rails are fastened than from the opposite wall;

a corner rib runs from the inner chamber wall to each of the four corners of the hollow section, and a center rib runs from the inner chamber wall to the wall associated with the two guide rails and to the opposite wall distant from the rails.

24. A linear guide unit according to claim 23, wherein the wall to which the two guide rails fastened is set back in a region lying between the two guide rails with respect to the associated corners regions in the direction of the inner chamber wall.

25. A linear guide unit according to claim 15, wherein:

a bridge unit is connected with at least one runner on each of the two guide rails for movement along the guide rails in the direction of the longitudinal axis; and the bridge unit has at least one fastening groove parallel to the longitudinal axis and accessible from outside.

26. A linear guide unit according to claim 25, wherein the bridge unit rests on connecting faces of the runners and is connected in the region of the said connecting with the runners.

27. A linear guide unit according to claim 15, wherein the hollow section is substantially rectangular in cross-section, having four walls, the guide rails are mounted on a first wall forming said first side surface, the longitudinal toothed rack is mounted on a wall adjacent the first wall and forming said second side surface, and the rotary drive unit and the toothed wheel are positioned along side adjacent the wall on which the longitudinal toothed rack is mounted.

28. A linear guide unit according to claim 27, wherein the longitudinal toothed rack is fastened to the hollow section by means of a fastening groove in the wall to which the toothed rack is fastened.

29. A linear guide unit according to claim 1, the linear guide unit being part of a multiple-member movement system whose members comprise at least a base and an object holder, wherein the members, starting from the base, which has a minimal number of degrees of freedom, to the object holder, which has a maximum number of degrees of freedom, have an increasing number of degrees of freedom, wherein the two components of the linear guide unit movable relative to one another, one of which comprises the runner assembly and the other of which comprises the elongated member, each constitutes a member of the movement system, the component lighter in weight having a greater degree of freedom and the component heavier in weight having a smaller degree of freedom.

30. A linear guide unit according to claim 29, wherein one component comprises the runner assembly, the rotary drive unit and the toothed wheel and has a smaller degree of freedom than the other component, which comprises the elongated member and the longitudinal toothed rack.

31. A linear guide unit according to claim 30, wherein the elongated member is displaceable in a vertical direction in relation to the runner assembly.

32. A linear guide unit according to claim 1, wherein at least two runner assemblies, each with a linear drive unit and movable independently of one another in the axial direction of the elongated member, are carried on the elongated member.

33. A linear guide unit according to claim 1, wherein:

at least two runner assemblies, capable of being driven independently of one another and each with a toothed wheel and a rotary drive unit, are associated with the elongated member; and the respective toothed wheels each mesh with a longitudinal toothed rack or a respective one of two separate toothed racks.

34. A linear guide unit, comprising:

an elongated member having a longitudinal axis and a rail system with at least two guide rails arranged outside on the elongated member with rail axes parallel to one another and to the longitudinal axis;

at least one runner assembly carried for longitudinal displacement on the rail system;

the elongated member being an extruded hollow section with an outer shell and an inner shell substantially surrounded by said outer shell, said outer shell having a substantially rectangular external cross-sectional configuration composed of four outer shell-external configuration walls, said inner shell having a substantially round cross-sectional configuration, said inner shell being secured to said outer shell by a plurality of bracing ribs extending between said inner shell and said outer shell, said inner shell having a geometrical center located substantially halfway between a first one and a second one of said outer shell-external configuration walls, said geometrical center of said inner shell having different distances from a third one and a fourth one of said outer shell-external configuration walls, said fourth outer shell-external configuration wall having a greater distance from said geometrical center than said third outer shell-external configuration wall;

each of said guide rails having a fastening surface, a head face remote from the fastening surface, and two side faces adjoining the head face;

said runner assembly comprising at least one substantially U-shaped runner on each of said guide rails, each said U-shaped runner having a transverse portion located adjacent to the head face of its associated guide rail and two arm portions interconnected by said transverse portion and located adjacent to said side faces of the associated guide rail;

said fastening surfaces of said at least two guide rails being located adjacent to the respective lateral ends of said fourth outer shell-external configuration wall and substantially in parallel to said fourth outer shell-external configuration wall; and said fourth outer shell-external configuration wall being set back toward said geometrical center of said inner shell in a region lying between said lateral ends of said fourth outer shell-external configuration wall.

35. A linear guide unit according to claim 34, wherein linear drive means is allocated to said runner assembly for longitudinal displacement of said runner assembly relative to said rail system.

36. A linear guide unit according to claim 35, wherein said linear drive means includes at least one flexible traction means for defining a closed loop, which drive means includes means for reversing said loop at the ends of the elongated member and which has driving parts driving the runner assembly on said rail system and returning parts which travel within said inner shell.

37. A linear guide unit according to claim 36, wherein said driving parts are drivingly connected to a piston unit, and said piston unit is slidingly accommodated within said inner shell.

38. A linear guide unit according to claim 35, wherein the linear drive means comprises a drive spindle extending parallel to the longitudinal axis and connected with a means for rotatable driving said drive spindle, said drive spindle being arranged axially fixed outside the outer shell adjacent said set-back region of said fourth outer shell-external configuration wall, and said drive spindle being in threaded engagement with a nut which is supported on the runner assembly.

39. A linear guide unit according to claim 35, wherein said linear drive means includes a longitudinal toothed rack located externally of the outer shell and extending parallel to the longitudinal axis adjacent to one of said first and second outer shell-external configuration walls, and further includes a drive motor which is connected to the runner assembly for movement conjointly therewith and for driving a toothed wheel meshing with said longitudinal toothed rack.

* * * * *

UNITED STATES PATENT AND TRADEMARK OFFICE
CERTIFICATE OF CORRECTION

PATENT NO. : 5,845,996

DATED : December 8, 1998

INVENTOR(S) : Roland Greubel and Bernhard Keller

It is certified that error appears in the above-identified patent and that said Letters Patent is hereby corrected as shown below:

Col. 13, lines 30 and 31, "spindel shown in phantom in Fig. 6" should read --spindle C1 (shown in phantom in Fig. 6)--;

Col. 13, lines 35 and 36, "member shown in phantom in Fig. 6" should read --member C2 (shown in phantom in Fig. 6)--;

Col.13, line 36, "to table 33" should read --to the table 33--;

Col. 15, line 34, "the longitudinal." should read --the longitudinal toothed rack on both sides of the region of engagement between the toothed wheel and the longitudinal toothed rack. --;

Col. 17, line 7, "rails fastened" should read --rails is fastened--;

Col. 17, line 19, "connecting with" should read --connecting faces with--;

Col. 17, line 27, "positioned along side adjacent" should read --positioned adjacent--.

Signed and Sealed this

Sixth Day of July, 1999

Attest:

Q. TODD DICKINSON

*Attesting Officer*   *Acting Commissioner of Patents and Trademarks*